(12) United States Patent
Yin

(10) Patent No.: US 11,886,798 B2
(45) Date of Patent: Jan. 30, 2024

(54) METHOD AND APPARATUS FOR OBTAINING LOADING TIME LENGTH OF IMAGE IN WEBPAGE, AND ELECTRONIC DEVICE

(71) Applicant: BEIJING BYTEDANCE NETWORK TECHNOLOGY CO., LTD., Beijing (CN)

(72) Inventor: Guohui Yin, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/772,628

(22) PCT Filed: Aug. 27, 2020

(86) PCT No.: PCT/CN2020/111776
§ 371 (c)(1),
(2) Date: Apr. 28, 2022

(87) PCT Pub. No.: WO2021/082693
PCT Pub. Date: May 6, 2021

(65) Prior Publication Data
US 2022/0374582 A1    Nov. 24, 2022

(30) Foreign Application Priority Data
Oct. 28, 2019  (CN) .......................... 201911032128.5

(51) Int. Cl.
*G06F 40/143*    (2020.01)
*G06F 16/957*    (2019.01)
*G06F 16/958*    (2019.01)

(52) U.S. Cl.
CPC ........ *G06F 40/143* (2020.01); *G06F 16/9574* (2019.01); *G06F 16/986* (2019.01)

(58) Field of Classification Search
CPC .. G06F 40/143; G06F 16/9574; G06F 16/986; G06F 16/972; G06F 9/44521
See application file for complete search history.

(56) References Cited

U.S. PATENT DOCUMENTS 9,009,296 B1 * 4/2015 Siganporia .............. G06F 13/14
709/224
10,002,117 B1 * 6/2018 Ain ....................... G06F 16/957
(Continued)

FOREIGN PATENT DOCUMENTS

CN    106598821 A    4/2017
CN    109039715 A    12/2018
(Continued)

OTHER PUBLICATIONS

First Office Action dated Dec. 17, 2021 in Chinese Patent Application No. 201911032128.5 (5 pages) with an English translation (7 pages).
(Continued)

*Primary Examiner* — Keith D Bloomquist

(57) ABSTRACT

Provided are a method and an apparatus for obtaining a loading time length of an image in a webpage, and an electronic device. The method includes: obtaining, during loading of a Hypertext Markup Language HTML file of the webpage, event tracking data through event tracking that is set in the HTML file, wherein the event tracking data includes loading start time of the HTML file; obtaining a timestamp of a loading end event of the image in the webpage, and determining the loading time length of the image based on the loading start time and the timestamp. The method can obtain the loading time length of the image in the webpage, facilitate the detection of the loading time length of the image, and provide data support for realizing the analysis of the webpage service quality based on the loading time length of the image and improving the webpage service quality.

16 Claims, 2 Drawing Sheets

(56) References Cited

U.S. PATENT DOCUMENTS

| | | | | |
|---|---|---|---|---|
| 10,291,738 B1* | 5/2019 | Jaiswal | ............... | H04L 67/5681 |
| 10,868,881 B1* | 12/2020 | Chang | ................ | H04L 67/5681 |
| 2006/0218490 A1* | 9/2006 | Fink | ...................... | G06F 40/143 |
| | | | | 715/234 |
| 2008/0114875 A1* | 5/2008 | Anastas | ................. | G06Q 30/02 |
| | | | | 709/224 |
| 2012/0137210 A1* | 5/2012 | Dillon | ................ | G06F 16/9574 |
| | | | | 715/234 |
| 2015/0212655 A1* | 7/2015 | Koski | ................. | G06F 3/04817 |
| | | | | 715/730 |
| 2019/0095408 A1 | 3/2019 | Ciabarra, Jr. et al. | | |

FOREIGN PATENT DOCUMENTS

| | | |
|---|---|---|
| CN | 109766256 A | 5/2019 |
| CN | 109815089 A | 5/2019 |
| CN | 110287441 A | 9/2019 |
| CN | 110781437 A | 2/2020 |

OTHER PUBLICATIONS

International Search Report dated Nov. 27, 2020 in International Application No. PCT/CN2020/111776 (3 pages) with an English translation.

Rejection Decision dated Jul. 19, 2022 in Chinese Patent Application No. 201911032128.5 (4 pages) with an English translation (5 pages).

* cited by examiner

METHOD AND APPARATUS FOR OBTAINING LOADING TIME LENGTH OF IMAGE IN WEBPAGE, AND ELECTRONIC DEVICE

CROSS-REFERENCE TO RELATED APPLICATION

This application claims priority to Chinese Patent Application No. 201911032128.5, filed on Oct. 28, 2019, which is hereby incorporated by reference in its entirety.

FIELD

The present disclosure relates to the technical field of computers, and more particularly, to a method and an apparatus for obtaining a loading time length of an image in a webpage, and an electronic device.

BACKGROUND

With the rapid development of Internet technology, more and more information can be obtained by people, and information in the form of pure text can no longer meet people's demands for information. Image information, because of its advantages such as intuitiveness and strong expressiveness, etc., is becoming more and more popular. At present, the proportion of image information contained in a webpage is getting higher and higher, which also puts forward higher requirements on the image service quality of browsers.

An image address of the image is recorded in an image tag of the HyperText Markup Language (HTML) file of the webpage, and when a terminal browser loads the HTML file of the webpage containing the image, the image can be obtained through the image address in the image tag.

In the related art, the loading time length of the image in the webpage cannot be obtained, and the analysis of the service quality of the webpage based on the loading time length of the image cannot be realized, and data support for improving the webpage service quality cannot be provided.

SUMMARY

This summary is provided to introduce ideas in a simplified form, and these ideas will be further described below in the detailed description. This summary is not intended to identify key features or essential features of the claimed technical solutions, or to limit the scope of the claimed solution.

The present disclosure aims to solve at least one of the above technical defects. The technical solutions adopted by the present disclosure are as follows.

According to a first aspect of the present disclosure, a method for obtaining a loading time length of an image in a webpage is provided. The method includes: obtaining, during loading of a HyperText Markup Language (HTML) file of the webpage, event tracking data through event tracking that is set in the HTML file, wherein the event tracking data includes loading start time of the HTML file; obtaining a timestamp of a loading end event of the image in the webpage; and determining the loading time length of the image based on the loading start time of the HTML file and the timestamp.

According to a second aspect of the present disclosure, an apparatus for obtaining a loading time length of an image in a webpage is provided. The apparatus includes: an event tracking data obtaining module configured to obtain, during loading of a HyperText Markup Language (HTML) file of the webpage, event tracking data through event tracking that is set in the HTML file, wherein the event tracking data includes loading start time of the HTML file; and a timestamp obtaining module configured to obtain a timestamp of a loading end event of the image in the webpage, and determine the loading time length of the image based on the loading start time of the HTML file and the timestamp.

According to a third aspect of the present disclosure, an electronic device is provided. The electronic device includes: a memory having a computer program stored thereon; and a processor configured to implement the method according to the first aspect of the present disclosure by calling the computer program.

According to a fourth aspect of the present disclosure, provided is a computer-readable storage medium having a computer program stored thereon, and the computer program, when executed by a processor, implements the method according to the first aspect of the present disclosure.

The technical solutions provided by the embodiments of the present disclosure at least bring the following beneficial effects.

According to the solutions of the embodiments of the present disclosure, by obtaining the event tracking data through the preset event tracking, the loading start time of the HTML file is obtained, the loading end time of the image is obtained through the timestamp of the loading end event of the image, and the relative loading time length of the image in the webpage can be determined based on the loading start time of the HTML file and the loading end time of the image. The solutions provided by the embodiments of the present disclosure can obtain the loading time length of the image in the webpage, facilitate the detection of the loading time length of the image, and provide data support for realizing the analysis of the webpage service quality based on the loading time length of the image and improving the webpage service quality.

BRIEF DESCRIPTION OF DRAWINGS

The above and other features, advantages, and aspects of the embodiments of the present disclosure will become more apparent with reference to the following detailed description in conjunction with the accompanying drawings. Throughout the drawings, the same or similar reference numerals represent the same or similar elements. It should be understood that the drawings are illustrative, and the components and elements are not necessarily drawn to scale.

In order to more clearly illustrate the technical solutions in embodiments of the present disclosure, the drawings used in the description of the embodiments of the present disclosure will be briefly described below.

DESCRIPTION OF EMBODIMENTS

Figure 1:
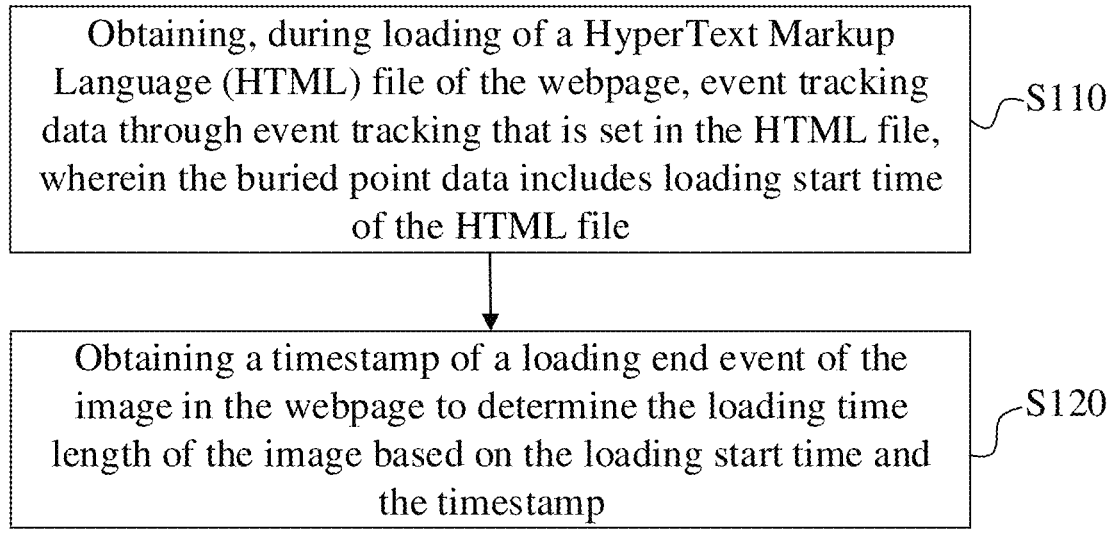
FIG. 1 is a schematic flowchart of a method for obtaining a loading time length of an image in a webpage according to an embodiment of the present disclosure.

Embodiments of the present disclosure will be described in more detail below with reference to the accompanying drawings. While some embodiments of the present disclosure are illustrated in the drawings, it should be understood that the present disclosure may be embodied in various forms and should not be construed as being limited to the embodiments set forth herein, and these embodiments are provided for a more complete and thorough understanding of the present disclosure. It should be understood that the drawings and the embodiments of the present disclosure are for illustration purposes only and are not intended to limit the scope of the present disclosure.

It should be understood that various steps recited in embodiments of the method of the present disclosure may be performed in a different order, and/or performed in parallel. Moreover, the embodiments of the method may include additional steps and/or omit performing the illustrated steps. The scope of the present disclosure is not limited in this respect.

The term "including" and variations thereof as used herein are open-ended, i.e., "including, but not limited to". The term "based on" means "based at least in part on". The term "one embodiment" means "at least one embodiment"; the term "another embodiment" means "at least one additional embodiment"; and the term "some embodiments" means "at least some embodiment". Relevant definitions for other terms will be given in the following description.

It should be noted that the terms "first", "second", and the like in the present disclosure are only used for distinguishing apparatuses, modules, or units, and are not used for limiting that these apparatuses, modules, or units are different apparatuses, modules, or units, or limiting the order or interdependence of the functions performed by the apparatuses, modules, or units.

It should be noted that term "a", "an", or "plurality of" in the present disclosure is illustrative rather than limiting, and shall be construed as "one or more" by those skilled in the art, unless clearly indicated otherwise. The names of messages or information exchanged between the apparatuses in the embodiments of the present disclosure are for illustrative purposes only, and are not intended to limit the scope of the messages or information.

In order to make the objectives, technical solutions, and advantages of the present disclosure clearer, the embodiments of the present disclosure will be described in detail below with reference to the accompanying drawings.

Images in a webpage may include images imported directly by image tags, images imported by Cascading Style Sheets (CSS) files, and images imported by iframe tags. In the related art, the performance of the browser is monitored through a performance interface (such as a Performance interface, namely, a Performance API) of the browser, but a loading time length of an image in a webpage cannot be obtained through the Performance API.

The embodiments of the present disclosure provide a method and an apparatus for obtaining a loading duration of an image in a webpage, and an electronic device, and aim to solve at least one of the above technical problems in the related art.

The technical solutions of the present disclosure and how the technical solutions solve the above technical problems are described in detail below with specific embodiments. These specific embodiments below may be combined with each other, and details of the same or similar concepts or processes may not be elaborated in some embodiments. The embodiments of the present disclosure will be described below with reference to the accompanying drawings.

FIG. 1 is a schematic flowchart of a method for obtaining a loading time length of an image in a webpage according to an embodiment of the present disclosure. As illustrated in FIG. 1, the method may include the following steps.

At step S110, during loading of a HyperText Markup Language (HTML) file of the webpage, event tracking data is obtained through event tracking that is set in the HTML file, the event tracking data including loading start time of the HTML file.

At step S120, a timestamp of a loading end event of the image in the webpage is obtained, and the loading time length of the image is determined based on the loading start time of the HTML file and the timestamp.

In the embodiment of the present disclosure, during the loading process of the HTML file of the webpage, the loading start time of the HTML file can be obtained by obtaining event tracking data through a preset event tracking.

In the embodiment of the present disclosure, when any image in the webpage is loaded completely, a loading end event corresponding to the image is executed, and loading end time of the image can be obtained by obtaining a timestamp of the loading end event of the image.

Alternatively, the loading end event is a loading completion (onload) event or a loading error (onerror) event. During loading of the HTML file, for any image in the page, if the loading of the image in the webpage is completed and the loading is successful, an onload event corresponding to the image is executed; if the loading of the image in the webpage fails, the onerror event corresponding to the image is executed; and either the loading being successful or the loading failing indicates that the loading of the image is ended. Therefore, the loading end time of the image can be determined by obtaining the timestamp of the onload event corresponding to the image or the timestamp of the onerror event corresponding to the image.

In practical application, after obtaining an HTML file of a webpage from a server, a terminal device starts loading the HTML file, loading start time of the HTML file is earlier than loading start time of an image in a page corresponding to the HTML file, and a time interval between the loading start time of the HTML file and the loading start time of the image is generally short. Therefore, the loading start time of the image can be characterized by the loading start time of the HTML file of the webpage. Then, the loading end time of the image is obtained by obtaining the timestamp of the loading end event, and the loading time length of the image is obtained based on the loading end time of the image and the loading start time of the image.

In embodiments of the present disclosure, if it is detected for multiple times that the loading time length of some images in the webpage exceeds a reasonable range, the images can be analyzed to determine the reason causing excessively long loading time length, and determine a corresponding processing method, so as to ensure the use experience of the user.

According to the method of the embodiments of the present disclosure, the loading start time of the HTML file is obtained by obtaining the event tracking data through the preset event tracking, and the loading end time of the image is obtained through the timestamp of the loading end event of the image. Since the loading start time of the HTML file of the webpage can be used to characterize the loading start time of the image, the relative loading time length of the image in the webpage can be determined based on the loading start time of the HTML file and the loading end time of the image. The solution provided by the embodiments of the present disclosure can obtain the loading time length of the image in the webpage, facilitate the detection of the loading time length of the image, and provide data support for realizing the analysis of the webpage service quality based on the loading time length of the image and improving the webpage service quality.

In an optional implementation of an embodiment of the present disclosure, the method may be performed by a client or a server.

When the method is performed by a client, the method further includes, subsequent to said obtaining the timestamp of the loading end event of the image in the webpage: determining the loading time length of the image based on the loading start time of the HTML file and the timestamp; and transmitting the loading time length of the image to a server; or transmitting the loading start time of the HTML file and the timestamp to the server; and determining, by the server, the loading time length of the image based on the loading start time of the HTML file and the timestamp.

In an embodiment of the present disclosure, the above-mentioned method may be performed by a client or a server. When the method is performed by a server, after a client has detected the loading start time of the HTML file and the timestamp of the loading end event of the image, the server obtains the loading start time of the HTML file and the timestamp of the loading end event of the image from the client, to determine the loading time length of the image based on the obtained loading start time of the HTML file and the obtained timestamp of the loading end event of the image.

When the method is performed by a client, after obtaining the loading start time of the HTML file and the timestamp of the loading end event of the image, the client can directly transmit the loading start time of the HTML file and the timestamp of the loading end event of the image to a server, and the server determines the loading time length of the image based on the loading start time of the HTML file and the timestamp of the loading end event of the image. Alternatively, the client may determine the loading time length of the image based on the loading start time of the HTML file and the timestamp of the loading end event of the image, and then transmit the loading time length of the image to the server.

In an optional implementation of an embodiment of the present disclosure, the event tracking is set in a head of the HTML file, and the loading start time of the HTML file is loading start time of the head.

In an embodiment of the present disclosure, the event tracking may be set in the head of the HTML file, and since the head is loaded first during the loading of the HTML file, and the loading start time of the head is later than the loading start time of the HTML file and earlier than the loading start time of the image in the page, the loading start time of the head is closer to actual loading start time of the image in the page than the loading start time of the HTML file. Therefore, the loading start time of the image may be characterized by the loading start time of the head, and the loading time length of the image determined based on the loading start time of the head and the loading end time of the image is more accurate.

In an optional implementation of an embodiment of the present disclosure, the loading start time of the HTML file is loading start time of an external file imported in the head.

In an embodiment of the present disclosure, a tag for importing an external file may exist in the head of the HTML file, and as an optional implementation, the external file may be a JavaScript (JS) file or a CSS file.

When the tag for importing the external JS file or the tag for importing the external CSS file is present in the head of the HTML file, the JS file or the CSS file in the head is loaded firstly, and loading start time of the JS file or the CSS file in the head is later than the loading start time of the head and is earlier than the loading start time of the image in the page. Therefore, the loading start time of the JS file or CSS file in the head is closer to the actual loading start time of the image in the page than the loading start time of the head. Therefore, the loading start time of the image can be characterized by the loading start time of the JS file or CSS file in the head, so as to determine a more accurate load time of the image.

Figure 2:
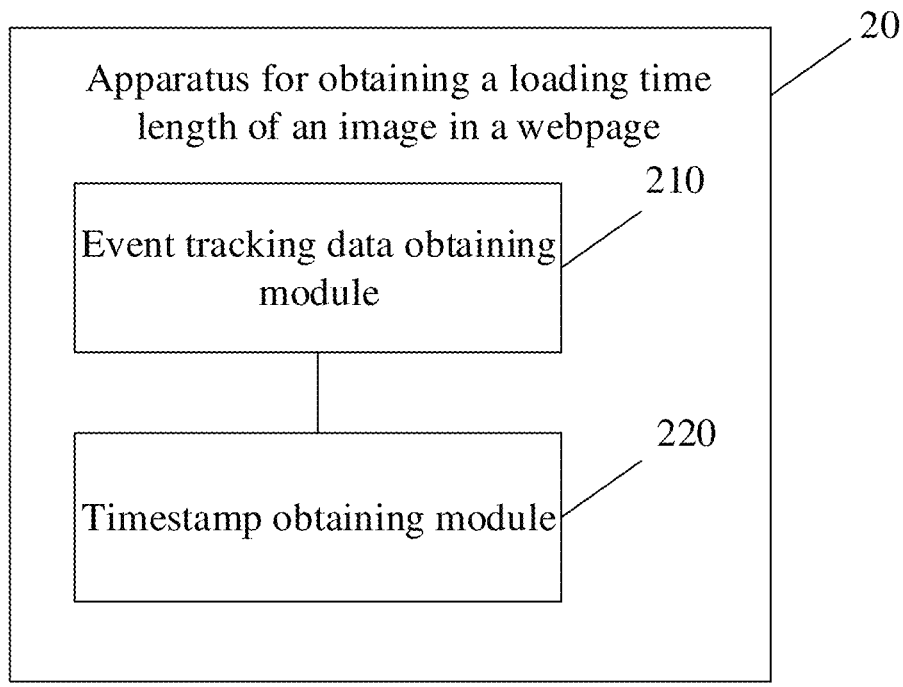
FIG. 2 is a schematic structural diagram of an apparatus for obtaining a loading time length of an image in a webpage according to an embodiment of the present disclosure.

Based on the same principle as the method shown in FIG. 1, FIG. 2 is a schematic structural diagram of an apparatus for obtaining a loading time length of an image in a webpage according to an embodiment of the present disclosure. As shown in FIG. 2, the apparatus 20 for obtaining a loading time length of an image in a webpage may include an event tracking data obtaining module 210 and a timestamp obtaining module 220.

The event tracking data obtaining module 210 is configured to obtain, during loading of a HTML file of the webpage, event tracking data through event tracking that is set in the HTML file, wherein the event tracking data includes loading start time of the HTML file.

The timestamp obtaining module 220 is configured to obtain a timestamp of a loading end event of the image in the webpage, and determine the loading time length of the image based on the loading start time of the HTML file and the timestamp.

According to the apparatus of the embodiments of the present disclosure, the loading start time of the HTML file is obtained by obtaining the event tracking data through the preset event tracking, and the loading end time of the image is obtained based on the timestamp of the loading end event of the image. Since the loading start time of the HTML file of the webpage can be used to characterize the loading start time of the image, the relative loading time length of the image in the webpage can be determined based on the loading start time of the HTML file and the loading end time of the image. The solution provided by the embodiments of the present disclosure can obtain the loading time length of the image in the webpage, facilitate the detection of the loading time length of the image, and provide data support for realizing the analysis of the webpage service quality based on the loading time length of the image and improving the webpage service quality.

Optionally, the apparatus may be provided in a client or a server.

When the apparatus is provided in a client, the apparatus may further include a first data processing module configured to: subsequent to said obtaining the timestamp of the loading end event of the image in the webpage, determine the loading time length of the image based on the loading start time of the HTML file and the timestamp, and transmit the loading time length of the image to the server; or a second data processing module configured to: subsequent to said obtaining the timestamp of the loading end event of the image in the webpage, transmit the loading start time of the HTML file and the timestamp to a server in such a manner that the server determines the loading time length of the image based on the loading start time of the HTML file and the timestamp.

Optionally, the loading end event is an onload event or an onerror event.

Optionally, the event tracking is set in a head of the HTML file, and the loading start time of the HTML file is loading start time of the head.

Optionally, the loading start time of the HTML file is loading start time of an external file imported in the head.

Optionally, the external file is a JavaScript file or a CSS file.

Figure 3:
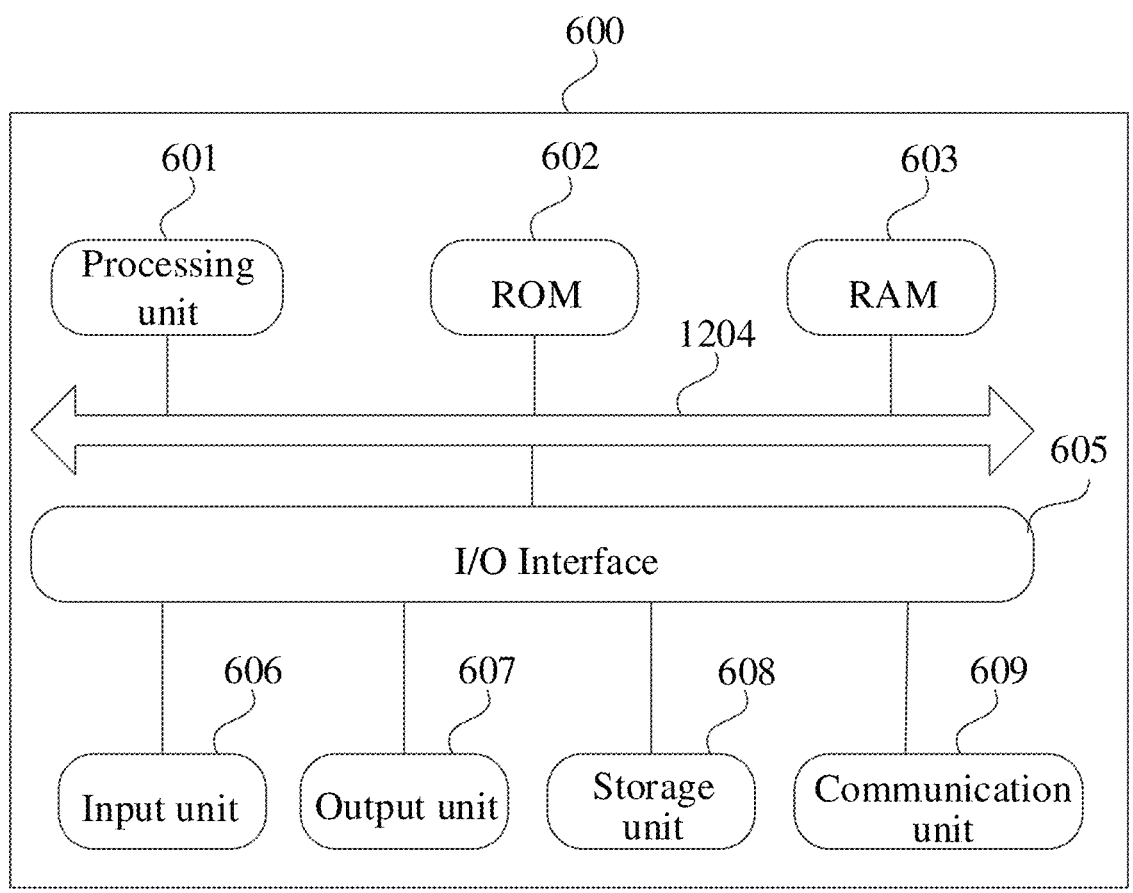
FIG. 3 is a schematic structural diagram of an electronic device according to an embodiment of the present disclosure.

Referring now to FIG. 3, FIG. 3 shows a schematic diagram of an electronic device (e.g., a terminal device or a server in FIG. 1) 600 adapted to implement the embodiments of the present disclosure. The terminal device according to the embodiments of the present disclosure may include, but are not limited to, mobile terminals such as a mobile phone, a laptop computer, a digital broadcast receiver, a Personal Digital Assistant (PDA), a tablet computer or PAD, a Portable Multimedia Player (PMP), and an on-vehicle terminal (e.g., an on-vehicle navigation terminal); and fixed terminals such as a digital TV, a desktop computer. The electronic device illustrated in FIG. 3 is exemplary only, and should not be construed as limiting the function and scope of use of the embodiments of the present disclosure.

The electronic device includes a memory and a processor. The processor herein may be referred to as a processing unit 601 hereinafter, and the memory may include at least one of a Read Only Memory (ROM) 602, a Random Access Memory (RAM) 603, or a storage unit 608, which are described in detail as follows.

As illustrated in FIG. 3, the electronic device 600 may include a processing unit (e.g., a central processing unit, a graphics processor, etc.) 601, which may perform various appropriate actions and processes in accordance with programs stored in a Read Only Memory (ROM) 602 or loaded from a storage unit 608 into a Random Access Memory (RAM) 603. Various programs and data required for operation of the electronic device 600 are also stored on the RAM 603. The processing unit 601, the ROM 602, and the RAM 603 are connected to each other through a bus 604. An input/output (I/O) interface 605 is also connected to the bus 604.

Generally, the following units may be connected to the I/O interface 605: an input unit 606, for example, a touch screen, a touch pad, a keyboard, a mouse, a camera, a microphone, an accelerometer, a gyroscope, etc.; an output unit 607, for example, a Liquid Crystal Display (LCD), a speaker, a vibrator, etc.; a storage unit 608, for example, magnetic tape, hard disk, etc.; and a communication unit 609. The communication unit 609 may allow the electronic device 600 to perform wireless or wired communication with other devices for data exchange. Although FIG. 3 illustrates the electronic device 600 having various units, it should be appreciated that it is not necessary to implement or provide all the illustrated units. Alternatively, more or fewer units may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a non-transient computer-readable medium. The computer program includes program codes for implementing the method illustrated in any of the flowcharts. In these embodiments, the computer program may be downloaded and installed from a network through the communication unit 609, or installed from the storage unit 608, or installed from the ROM 602. When the computer program is executed by the processing unit 601, the above-mentioned functions defined in the method according to the embodiments of the present disclosure are performed.

It is to be noted that the above computer-readable medium in the present disclosure may be a computer-readable signal medium or a computer-readable storage medium or any combination thereof. The computer-readable storage medium may be, but are not limited to, for example, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer magnetic disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory, a magnetic memory, or any suitable combination thereof. In the present disclosure, the computer-readable storage medium may be any tangible medium having programs contained or stored thereon, which may be used by or used with an instruction execution system, apparatus, or device. However, in the present disclosure, the computer-readable signal medium may include a data signal propagated in a baseband or as a part of a carrier, which carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), etc., or any suitable combination thereof.

In some embodiments, the client and the server may communicate using any currently known or future-developed network protocol, such as HTTP (HyperText Transfer Protocol), and may be in communication interconnection with digital data in any form or medium (e.g., a communication network). Examples of communication networks include a Local Area Network ("LAN"), a Wide Area Network ("WAN"), the Internet work (e.g., the Internet), and an end-to-end network (e.g., ad hoc end-to-end network), as well as any currently known or future-developed network.

The above-mentioned computer readable medium may be contained in the above-mentioned electronic device, or be present separately and not assembled into the electronic device.

The above-mentioned computer readable medium carries one or more programs which, when executed by the electronic device, cause the electronic device to: obtain, during loading of a HTML file of a webpage, event tracking data through event tracking that is set in the HTML file of the webpage, wherein the event tracking data includes loading start time of the HTML file; obtain a timestamp of a loading end event of an image in the webpage; and determine loading time length of the image based on the loading start time and the timestamp.

The computer program codes for implementing the operations according to the embodiments of the present disclosure may be written in one or more programming languages or any combination thereof. The programming languages may include, but are not limited to, object-oriented programming languages, such as Java, Smalltalk, or C++, as well as conventional procedure-oriented programming languages, such as "C" language or similar programming languages.

The program codes may be executed completely on a user computer, partly on a user computer, as a standalone software package, partly on a user computer and partly on a remote computer, or completely on a remote computer or server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, the functions showed in blocks may occur in an order other than the order illustrated in the drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented using a dedicated hardware-based system configured to perform specified functions or operations or may be implemented using a combination of dedicated hardware and computer instructions.

The modules or units described in the embodiments of the present disclosure may be embodied as software or hardware. The name of a module or unit does not in some cases constitute a limitation on the unit itself, for example, the event tracking data obtaining module may also be described as "a module that can obtain event tracking data through event tracking".

The functions described herein above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), etc.

In the context of this disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium would include an electrical connection having one or more wires, a portable computer disk, a hard disk, a Random Access Memory (RAM), a Read Only Memory (ROM), an Erasable Programmable Read Only Memory (EPROM) or flash memory, an optical fiber, a Compact Disc Read Only Memory (CD-ROM), an optical memory, a magnetic memory, or any suitable combination thereof.

According to one or more embodiments of the present disclosure, the present disclosure provides a method for obtaining a loading time length of an image in a webpage, including: obtaining, during loading of a HTML file event in the webpage, event tracking data through event tracking that is set in the HTML file, wherein the event tracking data includes loading start time of the HTML file; obtaining a timestamp of a loading end event of the image in the webpage; and determining the loading time length of the image based on the loading start time of the HTML file and the timestamp.

According to the method for obtaining the loading time length of the image in the webpage provided by the present disclosure, the method is performed by a client or a server; when the method is performed by the client, the method further includes, subsequent to said obtaining the timestamp of the loading end event of the image in the webpage: determining the loading time length of the image based on the loading start time of the HTML file and the timestamp, and transmitting the loading time length of the image to a server; or transmitting the loading start time of the HTML file and the timestamp to a server, and determining, by the server, the loading time length of the image based on the loading start time of the HTML file and the timestamp.

According to the method for acquiring webpage image loading time length provided by the present disclosure, the loading end event is an onload event or an onerror event.

According to the method for acquiring webpage image loading time length provided by the present disclosure, the event tracking is set in a head of the HTML file, and the loading start time of the HTML file is loading start time of the head.

According to the method for acquiring webpage image loading time length provided by the present disclosure, the loading start time of the HTML file is loading start time of an external file imported in the head.

According to one or more embodiments of the present disclosure, the external file is a JavaScript file or CSS file.

According to one or more embodiments of the present disclosure, an apparatus for obtaining a loading time length of an image in a webpage includes an event tracking data obtaining module configured to obtain, during loading of a HTML file event in the webpage, event tracking data through event tracking that is set in the HTML file, wherein the event tracking data includes loading start time of the HTML file; and a timestamp obtaining module configured to obtain a timestamp of a loading end event of an image in the webpage, and determine the loading time length of the image based on the loading start time of the HTML file and the timestamp.

According to the apparatus for obtaining the loading time length of an image in a webpage provided by the present disclosure, the apparatus can be configured as a client or a server; when the apparatus is configured as a client, the apparatus may further include a first data processing module configured to: subsequent to said obtaining the timestamp of the loading end event of the image in the webpage, determine the loading time length of the image based on the loading start time of the HTML file and the timestamp, and transmit the loading time length of the image to a server; or a second data processing module configured to: subsequent to said obtaining the timestamp of the loading end event of the image in the webpage, transmit the loading start time of the HTML file and the timestamp to a server in such a manner that the server determines the loading time length of the image based on the loading start time and the timestamp.

According to the apparatus for obtaining the loading time length of the image in the webpage provided by the present disclosure, the loading ending event is an onload event or an onerror event.

According to the apparatus for obtaining the loading time length of the image in the webpage provided by the present disclosure, the event tracking is set in a head of the HTML file, and the loading start time of the HTML file is loading start time of the head.

According to the apparatus for obtaining the loading time length of the image in the webpage provided by the present disclosure, the loading start time of the HTML file is loading start time of an external file imported in the head.

According to the apparatus for obtaining the loading time length of the image in the webpage provided by the present disclosure, the external file is a JavaScript file or a CSS file.

The above description is only intended to explain the preferred embodiments of the present disclosure and the employed principles of technology. It will be appreciated by those skilled in the art that the scope of the present disclosure herein is not limited to the technical solutions formed by the specific combination of the above technical features, but should also encompass any other combinations of features described above or equivalents thereof without departing from the above ideas of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms for implementing the claims.

What is claimed is:

1. A method for obtaining a loading time length of an image in a webpage, comprising:
   obtaining, during loading of a HyperText Markup Language (HTML) file of the webpage, event tracking data through event tracking that is set in the HTML file, wherein the event tracking data comprises loading start time of the HTML file, the event tracking is set in a head of the HTML file, a tag for importing an external file exists in the head of the HTML file, and the loading start time is loading start time of the external file imported in the head;
   obtaining a timestamp of a loading end event of the image in the webpage; and
   determining the loading time length of the image based on the loading start time and the timestamp.

2. The method according to claim 1, wherein the method is performed by a client or a server;
   when the method is performed by the client, the method further comprises, subsequent to said obtaining the timestamp of the loading end event of the image in the webpage:
   determining the loading time length of the image based on the loading start time and the timestamp, and transmitting the loading time length to a server; or
   transmitting the loading start time and the timestamp to the server, wherein the loading time length of the image being determined by the server based on the loading start time and the timestamp.

3. The method according to claim 1, wherein when the method is performed by a server, the method further comprises, after a client has detected the loading start time of the HTML file and the timestamp of the loading end event of the image: obtaining, by the server from the client, the loading start time of the HTML file and the timestamp of the loading end event of the image, to determine the loading time length of the image based on the obtained loading start time of the HTML file and the obtained timestamp of the loading end event of the image.

4. The method according to claim 1, wherein the loading end event is a loading completion event or a loading error event.

5. The method according to claim 1, wherein the external file is a JavaScript file or Cascading Style Sheet (CSS) file.

6. An apparatus for obtaining a loading time length of an image in a webpage, comprising:
   an event tracking data obtaining module configured to obtain, during loading of a HyperText Markup Language (HTML) file of the webpage, event tracking data through event tracking that is set in the HTML file, wherein the event tracking data comprises loading start time of the HTML file, the event tracking is set in a head of the HTML file, a tag for importing an external file exists in the head of the HTML file, and the loading start time is loading start time of the external file imported in the head; and
   a timestamp obtaining module configured to obtain a timestamp of a loading end event of the image in the webpage, and determine the loading time length of the image based on the loading start time and the timestamp.

7. The apparatus according to claim 6, wherein the loading end event is a loading completion event or a loading error event.

8. An electronic device, comprising:
   a memory having a computer program stored thereon; and
   a processor configured to implement a method for obtaining a loading time length of an image in a webpage by executing the computer program,
   wherein the method comprises:
   obtaining, during loading of a HyperText Markup Language (HTML) file of the webpage, event tracking data through event tracking that is set in the HTML file, wherein the event tracking data comprises loading start time of the HTML file, the event tracking is set in a head of the HTML file, a tag for importing an external file exists in the head of the HTML file, and the loading start time is loading start time of an external file imported in the head;
   obtaining a timestamp of a loading end event of the image in the webpage; and
   determining the loading time length of the image based on the loading start time and the timestamp.

9. A computer-readable storage medium, having a computer program stored thereon, wherein the computer program, when executed by a processor, implements the method according to claim 1.

10. The electronic device according to claim 8, wherein the method is performed by a client or a server;
when the method is performed by the client, the method further comprises, subsequent to said obtaining the timestamp of the loading end event of the image in the webpage:
determining the loading time length of the image based on the loading start time and the timestamp, and transmitting the loading time length to a server; or
transmitting the loading start time and the timestamp to the server, wherein the loading time length of the image being determined by the server based on the loading start time and the timestamp.

11. The electronic device according to claim 8, wherein when the method is performed by a server, the method further comprises, after a client has detected the loading start time of the HTML file and the timestamp of the loading end event of the image: obtaining, by the server from the client, the loading start time of the HTML file and the timestamp of the loading end event of the image, to determine the loading time length of the image based on the obtained loading start time of the HTML, file and the obtained timestamp of the loading end event of the image.

12. The electronic device according to claim 8, wherein the loading end event is a loading completion event or a loading error event.

13. The electronic device according to claim 8, wherein the external file is a JavaScript file or Cascading Style Sheet (CSS) file.

14. The computer-readable storage medium according to claim 9, wherein the method is performed by a client or a server;
when the method is performed by the client, the method further comprises, subsequent to said obtaining the timestamp of the loading end event of the image in the webpage:
determining the loading time length of the image based on the loading start time and the timestamp, and transmitting the loading time length to a server; or
transmitting the loading start time and the timestamp to the server, wherein the loading time length of the image being determined by the server based on the loading start time and the timestamp.

15. The computer-readable storage medium according to claim 9, wherein when the method is performed by a server, the method further comprises, after a client has detected the loading start time of the HTML file and the timestamp of the loading end event of the image: obtaining, by the server from the client, the loading start time of the HTML file and the timestamp of the loading end event of the image, to determine the loading time length of the image based on the obtained loading start time of the HTML file and the obtained timestamp of the loading end event of the image.

16. The computer-readable storage medium according to claim 9, wherein the loading end event is a loading completion event or a loading error event.

\* \* \* \* \*